United States Patent
Cheung et al.

(10) Patent No.: US 8,376,910 B2
(45) Date of Patent: Feb. 19, 2013

(54) METHODS, SYSTEMS, AND COMPUTER PROGRAM PRODUCTS FOR PROVIDING REMOTE PARTICIPATION IN MULTI-MEDIA EVENTS

(75) Inventors: Eric Cheung, New York, NY (US); Gerald Karam, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 733 days.

(21) Appl. No.: 12/572,458

(22) Filed: Oct. 2, 2009

(65) Prior Publication Data

US 2011/0082008 A1 Apr. 7, 2011

(51) Int. Cl.
*A63B 71/00* (2006.01)
(52) U.S. Cl. .................. 482/8; 482/1; 482/901
(58) Field of Classification Search .................. 482/1–9, 482/900–902
See application file for complete search history.

(56) References Cited

U.S. PATENT DOCUMENTS

| | | | |
|---|---|---|---|
| 8,012,064 B2* | 9/2011 | Martens | 482/8 |
| 8,112,251 B2* | 2/2012 | Case et al. | 702/182 |
| 8,152,695 B2* | 4/2012 | Riley et al. | 482/9 |
| 2002/0045519 A1* | 4/2002 | Watterson et al. | 482/54 |

* cited by examiner

*Primary Examiner* — Glenn Richman
(74) *Attorney, Agent, or Firm* — Cantor Colburn LLP

(57) ABSTRACT

Methods, systems, and computer program products for implementing remote participation in events are provided. A method includes providing a view of an instance of an application on endpoint systems in response to a common option selected by the endpoint systems of the application. The method also includes receiving performance data from the endpoint systems, and populating the view with virtual representations of users of each of the endpoint systems. The populating includes positioning the virtual representations at various locations in the view. The various locations are indicative of the performance data.

20 Claims, 4 Drawing Sheets

METHODS, SYSTEMS, AND COMPUTER PROGRAM PRODUCTS FOR PROVIDING REMOTE PARTICIPATION IN MULTI-MEDIA EVENTS

BACKGROUND

The present invention relates generally to networking, and more particularly, to methods, systems, and computer program products for providing remote participation in multi-media events.

As more and more individuals are opting for a healthier lifestyle, fitness enterprises look for new and more interesting exercise programs to engage their customers and maintain long term commitments. Boredom is often cited as one of the main reasons people fail to maintain an exercise regime. Group exercise has recently become more popular as a way of maintaining interest in a program over time. Group exercise is known to stimulate social interactions and create friendships, which can help eliminate boredom. However, it is not always feasible to find groups of like-minded individuals who share the same interests in exercise activities. Moreover, even once these like-minded individuals are found, it is not always feasible to synchronize exercise plans among individuals who have busy lives and limited free time. In these situations, one might need to go beyond the convenience of locality to find others who share the same fitness goals.

What is needed, therefore, is a way to provide a means in which individuals in disparate locations can remotely and simultaneously engage in events.

BRIEF SUMMARY

The above-stated shortcomings and disadvantages are overcome or alleviated by methods, systems, and computer program products for providing remote participation in events.

The method includes providing a view of an instance of an application on endpoint systems in response to a common option selected by the endpoint systems of the application. The method also includes receiving performance data from the endpoint systems, and populating the view with virtual representations of users of each of the endpoint systems. The populating includes positioning the virtual representations at various locations in the view. The various locations are indicative of the performance data.

The system includes a host system computer and an application executing on the host system computer. The application implements a method. The method includes providing a view of an instance of an application on endpoint systems in response to a common option selected by the endpoint systems of the application. The method also includes receiving performance data from the endpoint systems, and populating the view with virtual representations of users of each of the endpoint systems. The populating includes positioning the virtual representations at various locations in the view. The various locations are indicative of the performance data.

The computer program product includes a computer-readable storage medium for providing remote participation in events. The computer program product includes a computer-readable storage medium embodied with computer-readable program instructions, which when executed by a computer cause the computer to implement a method. The method includes providing a view of an instance of an application on endpoint systems in response to a common option selected by the endpoint systems of the application. The method also includes receiving performance data from the endpoint systems, and populating the view with virtual representations of users of each of the endpoint systems. The populating includes positioning the virtual representations at various locations in the view. The various locations are indicative of the performance data.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

DETAILED DESCRIPTION OF EXEMPLARY EMBODIMENTS

In accordance with exemplary embodiments, remote participation in multi-media events is provided. The remote participation in multi-media events services provide users with an engaging experience in virtual participation in physical activities. The remote participation in multi-media events system utilizes various devices, such as mobile telephones, Internet Protocol-enabled televisions (IPTVs), and computers to provide a rich user interface to each user, and connects the users together with communication elements over various networks.

Figure 1:
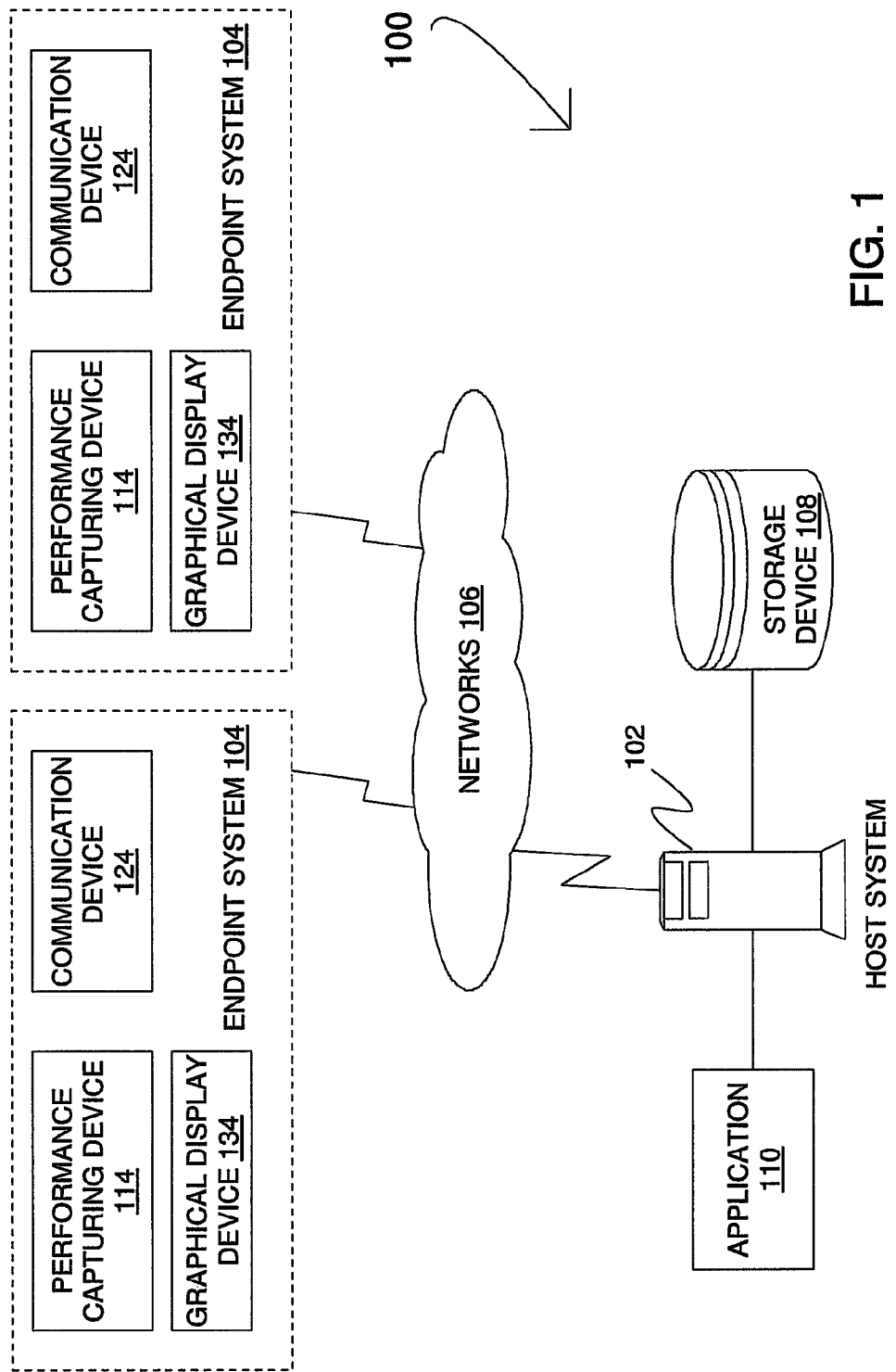
FIG. 1 is a block diagram of a system upon which remote participation in multi-media events may be implemented in exemplary embodiments.

Referring now to FIG. 1, an exemplary system 100 upon which the remote participation in multi-media events services may be implemented is depicted. The system 100 includes a host system 102 executing computer instructions for performing remote participation in multi-media events as described more fully below. Host system 102 may comprise a high-speed computer processing device, such as a mainframe computer, to manage the volume of operations governed by an entity for which the remote participation in multi-media events services are provided.

In one exemplary embodiment, the host system 102 may be part of an enterprise (e.g., a commercial business) that implements the remote participation in multi-media events services. Host system 102 may be a telecommunication service provider, Internet service provider, application service provider, or other commercial enterprise. Alternatively, the remote participation in multi-media events services may be implemented in conjunction with a social networking site. In a further embodiment, the remote participation in multi-media events services may be implemented as a standalone application that is executed on end user devices that are network enabled.

The host system 102 is in communication with network entities via one or more networks 106. As shown in FIG. 1, network entities include endpoint systems 104. The remote participation in group multi-media events may be implemented using a variety of wireless and wireline networking technologies such as a packet-switched network, a cellular network, and may include available technologies such as satellite, global positioning, and other resources. In addition, the networks 106 may include any type of known network including, but not limited to, a wide area network (WAN), a local area network (LAN), a global network (e.g., Internet), a virtual private network (VPN), and an intranet.

In an exemplary embodiment, the system 100 depicted in FIG. 1 includes endpoint systems 104 through which users at one or more geographic locations may contact the host system 102 and other endpoint systems 104. The endpoint systems 104 may be coupled to the host system 102 via one or more of the networks 106, depending upon the type of devices employed by the endpoint systems 104. The endpoint systems 104 represent one or more devices, components, or apparatuses associated with a user or household or other entity that utilizes the remote participation in multi-media events services. For example, an endpoint system 104 may represent devices owned/operated by members of a household.

As shown in FIG. 1, two endpoint systems 104 each include a performance data capturing device 114, a communication device 124, and a graphical display device 134. It will be understood that while only a single performance data capturing device 114, communication device 124, and graphical display device 134 for each endpoint system 104 is shown in FIG. 1 for illustrative purposes, multiple devices 114, 124, and/or 134 may be resident within the endpoint systems 104. Likewise, while only two endpoint systems 104 are shown in FIG. 1 for illustrative purposes, it will be understood that any number of such endpoint systems 104 may be included to utilize the remote participation in multi-media events services described herein.

In an exemplary embodiment, endpoint system 104 includes stationary exercise equipment, such as a treadmill, stair climber, elliptical machine, rowing machine, and/or stationary bicycle (not shown). The endpoint system 104 may also include mobile exercise devices, such as a road bicycle, and other similar devices (not shown). If the endpoint system 104 includes stationary exercise equipment, the remote participation in multi-media events services may be employed in a fixed location (e.g., a user's home, fitness club, etc.). Alternatively, or in addition thereto, if the endpoint system 104 includes mobile exercise devices, the remote participation in multi-media events services may be employed in a mobile environment (e.g., a jogging trail), as will be described further herein.

In an exemplary embodiment, the endpoint system 104 also includes one or more performance capturing devices 114. The performance capturing device 114 receives or captures data relating to a user with respect to activities performed in association with one or more of the stationary exercise equipment and the mobile exercise devices. Types of performance capturing devices may include a pedometer, accelerometer, global positioning system (GPS), and various sensors. Types of data captured by performance capturing devices 114 may include speed, distance, grade, resistance, or level with respect to an individual's exercise performance. Other types of data captured may include wind speed, topographical/geographical data, real-time images/video of an individual or environment, and audio/textual commentary from an individual, to name a few. In one exemplary embodiment, the performance capturing device(s) 114 are built into one or more of the stationary exercise equipment and the mobile exercise devices. For example, current treadmills are equipped with mechanisms for capturing speed, distance, incline, calories burned, and other performance data.

In an exemplary embodiment, the communication device 124 includes components for receiving and transmitting content, such as data, images, video, sound, etc. The communication device 124 may be a wireless portable communications device (cellular telephone, digital camera phone, video camera phone, personal digital assistant (PDA), or other handheld communications device). The communication device 124 may alternatively be a wired communication device, such as a general-purpose computer, telephone, Voice-over-IP (VoIP) device, and Internet Protocol-enabled television (IPTV), to name a few. It will be understood that any of the performance capturing devices 114 may be integrated within the communication devices 124. For example, GPS functionality (performance capturing device) may be built into a cellular telephone (communication device). Likewise, any of the communication devices 124 may be integrated within the performance capturing devices 114.

In an exemplary embodiment, graphical display device 134 includes components for presenting information to a user of the remote participation in multi-media events services. The graphical display device 134 may be, e.g., a display monitor on one of the communication devices 124 and/or stationary/mobile exercise equipment or devices.

One or more of the devices 114, 124, and 134 may include a computer processor, memory, input/output components, and a communication bus that delivers data to and from these components. The devices 114, 124, and 134 may also include a communications component for enabling one or more devices 114, 124, and 134 to communication with one another, as well as one or more of networks 106.

Figure 3A:
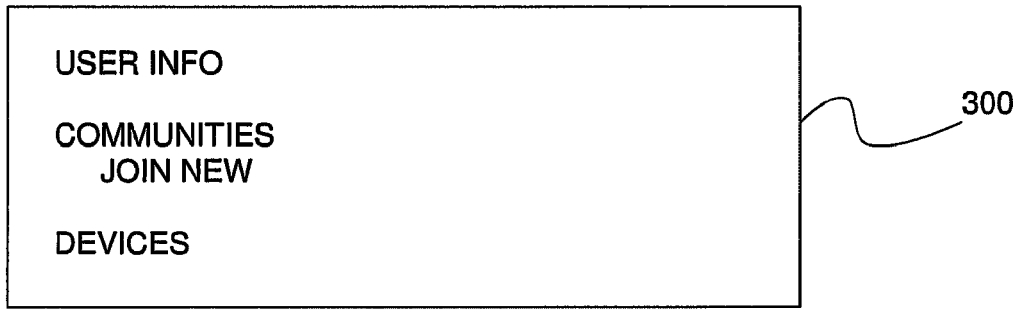
FIGS. 3A-3C are sample computer screen windows for initiating remote participation in multi-media events.
Figure 3B:
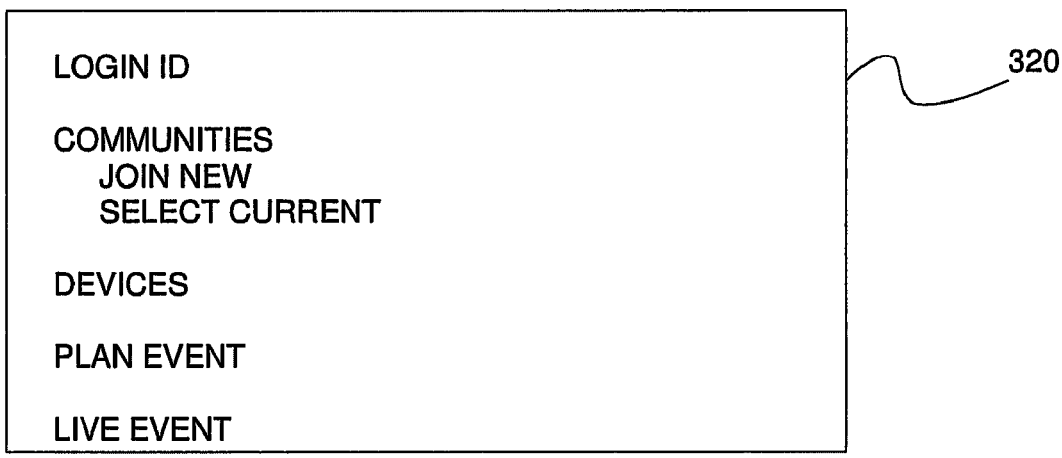
Figure 3C:
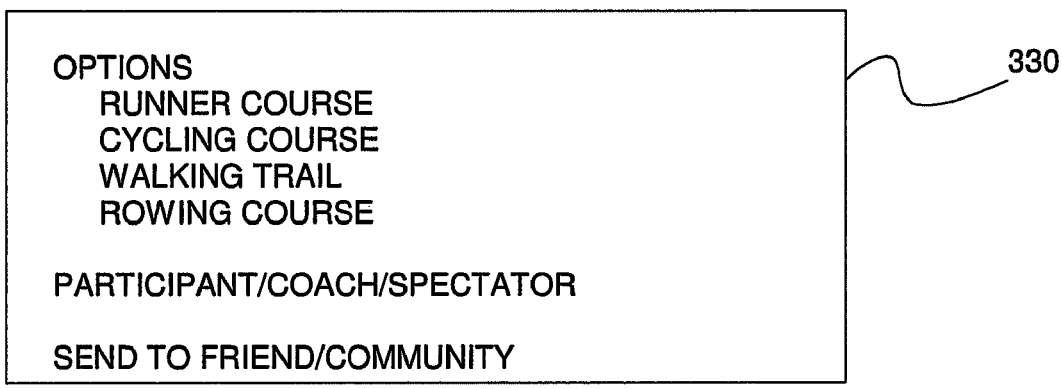
Figure 4:
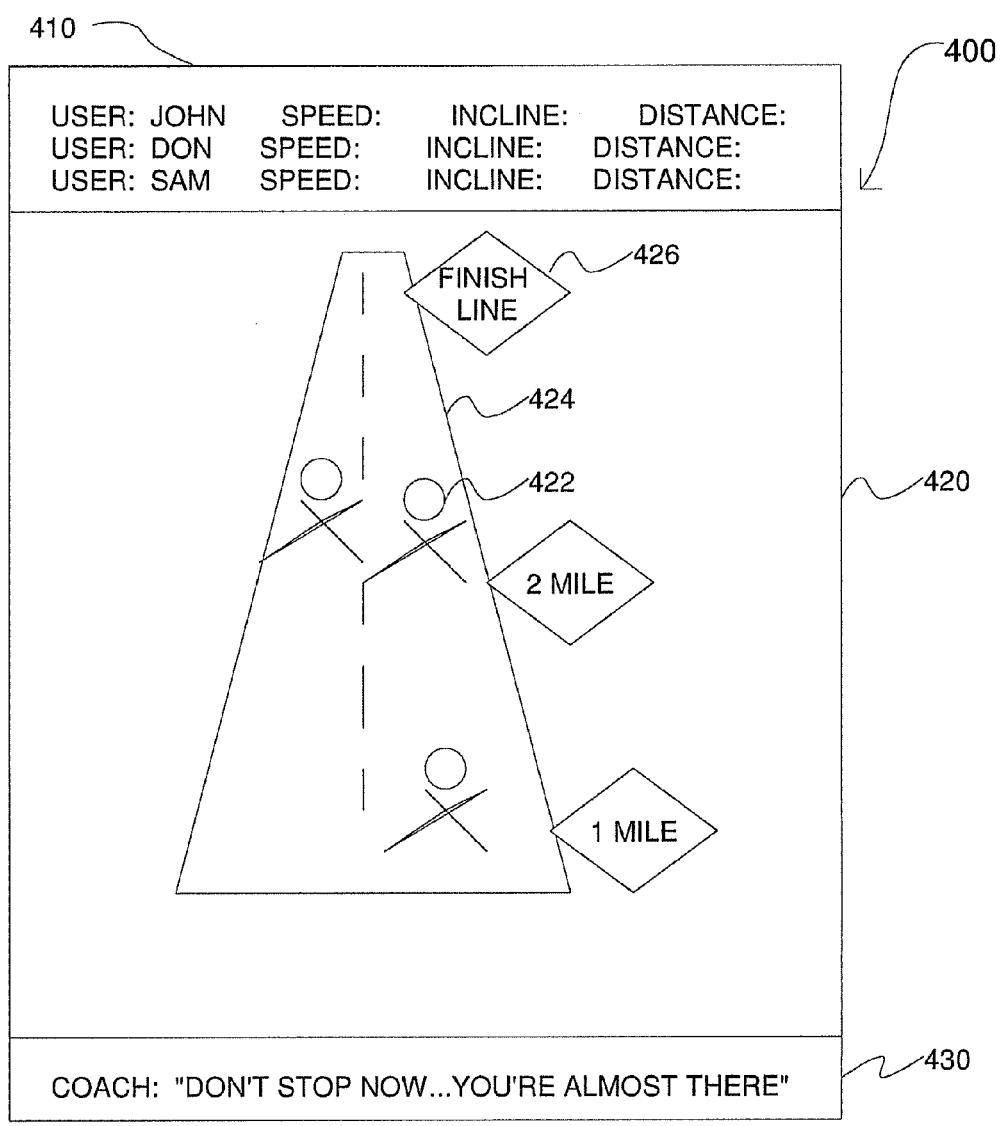
FIG. 4 is a user interface window illustrating a sample group event as seen by an end user of the remote participation in multi-media events system in exemplary embodiments.

In an exemplary embodiment, the endpoint system 104, through one or more of its devices 114, 124, and 134, executes logic for implementing the remote participation in multi-media events services. The endpoint system 104 utilizes a user interface provided by the remote participation in multi-media events services, as will be described further herein. A sample user interface screen is shown in FIGS. 3 and 4.

As indicated above, each endpoint system 104 may be implemented using one or more computer processors executing a computer program for carrying out the processes described herein. The processing described herein may be shared by the endpoint system 104 and the host system 102 (e.g., by providing an applet to the endpoint system 104). Endpoint system 104 may be operated by end users of the remote participation in multi-media events services, as described herein.

For example, an endpoint system 104, through one or more of its devices 114, 124, and 134, may be coupled to the host system 102 through multiple networks (e.g., intranet and Internet) so that not all endpoint systems 104 are coupled to the host system 102 through the same network. One or more of the endpoint systems 104 and the host system 102 may be connected to the networks 106 in a wireless fashion.

In exemplary embodiments, one or more of the data capturing devices 114 capture performance data, which may be transmitted along with multi-media content (e.g., images, real-time video, audio, etc.) for an event or activity to the host system 102.

The host system 102 is also in communication with a storage device 108, which includes a data repository with data relating to the remote participation in multi-media events services, as well as other data/information desired by the entity representing the host system 102 of FIG. 1. For example, the storage device 108 may store member records/event information as described further herein. The storage device 108 may be logically addressable as a consolidated data source across a distributed environment that includes networks 106. Information stored in the host system 102 memory may be retrieved and manipulated through the host system 102 and/or via the endpoint systems 104.

The host system 102 depicted in the system of FIG. 1 may be implemented using one or more servers operating in response to a computer program stored in a storage medium accessible by the server. The host system 102 may operate as a network server (e.g., a web server) to communicate with the endpoint system 104. The host system 102 handles sending and receiving information to and from the endpoint system 104 and can perform associated tasks. The host system 102 may also include a firewall to prevent unauthorized access to the host system 102 and enforce any limitations on authorized access. For instance, an administrator may have access to the entire system and have authority to modify portions of the system. A firewall may be implemented using conventional hardware and/or software as is known in the art.

The host system 102 may also operate as an application server. The host system 102 executes one or more computer programs to provide the remote participation in multi-media events services. As shown in FIG. 1, an application 110 executes on the host system 102 for providing the remote participation in multi-media events services.

As indicated above, processing may be shared by the endpoint system 104 and the host system 102 by providing an application (e.g., java applet) to the endpoint system 104. Alternatively, the endpoint system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the remote participation in multi-media events processes described herein may be implemented in hardware, software, or a combination thereof.

As indicated above, the remote participation in multi-media events services provide users with an engaging experience in virtual participation in physical activities (also referred to herein as "events"). The experience may be represented on graphical display device 134 as a real-time event that includes real images of a user (e.g., streaming video of a user engaged in a physical activity), or as a real-time event that utilizes virtual representations of a user (e.g., an avatar) engaged in the physical activity. If the event implements virtual representations of users, the event, as displayed in a view by an instance of the application 110, may include an animated event course (e.g., a simulated running/walking trail, simulated staircase, simulated river or other body of water, etc., depending upon the nature of the event or activity). These, and other features of the remote participation in multi-media events services, are described further in FIGS. 2-4.

In an exemplary embodiment, a user accesses the remote participation in multi-media events services via a user interface provided by the application 110 executing on host system 102. In one exemplary embodiment, if this is a first-time user, the user may be prompted to enter identifying information, such as name and contact information (e.g., email address), a sample user interface screen 300 of FIG. 3A illustrates this process. The user may also be prompted to select a community to join, as shown in FIG. 3A (i.e., JOIN NEW). By way of illustration, the remote participation in multi-media events services may be configured to provide group memberships based upon a user's interests. For example, groups, or communities may be designated for those who are interested in running, walking, rowing, stair-climbing, or other physical activity, whereby each physical activity may be defined for a particular group.

In one embodiment, the user may also be prompted to enter information about devices utilized in these physical activities (e.g., one or more devices 114, 124, 134, and stationary/mobile exercise devices or equipment (e.g., by selecting the DEVICE option shown in FIG. 3A). The device information may include descriptions of the type of communication devices 124 (e.g., cellular telephone, IPTV, desktop computer, etc.), as well as the capabilities of such devices 124. In addition, the device information may include descriptions of the type of exercise equipment (e.g., treadmill, stairclimber, stationary bike, etc.) and/or data capturing devices 114 (e.g., cellular telephone, IPTV, desktop computer, camera/video recorder, etc.), as well as the capabilities of such devices 114. Alternatively, some of this information may be automatically discovered by the host system 102 when the user accesses the application 110 using one of the devices (e.g., by using a cellular phone, personal computer, etc.). Once this information is provided to the application 110, the application 110 may create and store this information in a member record for the user and/or the endpoint system 104 associated with the user.

Figure 2:
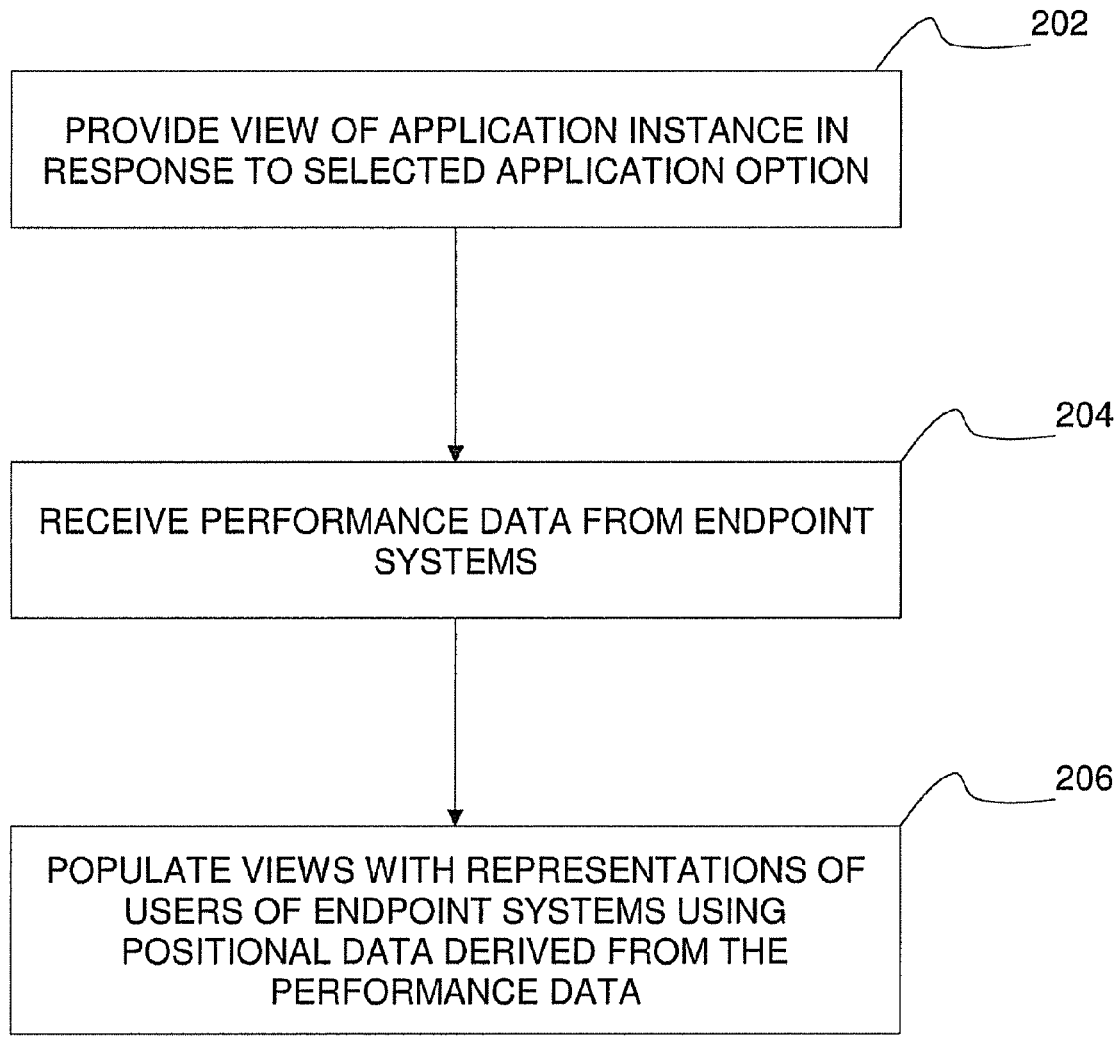
FIG. 2 is a flow diagram describing a process for implementing remote participation in multi-media events in exemplary embodiments.

Turning now to FIG. 2, an exemplary process for implementing the remote participation in multi-media events services will now be described. A user accesses the application 110 in order to participate in an event, such as a virtual group jogging activity. The user accesses the application 110 via a user interface provided by the application 110, and which may be visualized, e.g., on one of the devices 114, 124, and 134 via a display element. A sample user interface screen 320 is shown in FIG. 3B. The user may be prompted to enter a username/password combination as part of a log in process, where the log in information was generated via the user interface screen 310 of FIG. 3A (e.g., via the USER INFO selection). The user may further be prompted to either join a new community or select from an existing community to which the user is currently a member. For example, if the user opted to join a community through the JOIN NEW option in FIG. 3A, this user may then select this community as a member from the SELECT CURRENT option in FIG. 3B.

The user may also select from existing devices 114, 124, and/or 134 for use in identifying or planning the desired event. If the user wishes to generate a new event to occur at a future time, the user may select a PLAN EVENT option on the user interface screen 320 of FIG. 3B. This new event may be created by the user and the information then stored in storage device 108. The details of the new event, e.g., date, time, event type (e.g., running, cycling, rowing, etc.) along with device type information (e.g., a simulated event course generated by the application 110 or a real life course that is captured via, e.g., live streaming data and distributed to other endpoint systems 104 who are participating in the event). Once the event is created, it may be accessed by members of the community to which the user belongs, and/or to the general population of users of the remote participation in multi-media events services if desired. For example, once the event is created and stored, other users who access the application via the user interface screen 320 of FIG. 3B may discover the event, e.g., by selecting a corresponding group associated with the user who created the event.

In addition to creating an event, a user may also join a live ongoing event by selecting LIVE EVENT from the user interface screen 320 of FIG. 3B. By selecting this option, various currently occurring events may be displayed to the user for selection and participation. These currently occurring events displayed to the user are referred to herein as "views" of the application 110. Regardless of whether the user wishes to create a new event or join an existing event, the application 110 presents another user interface screen 330 to the user for providing additional information. The user may select from various events (e.g., RUNNER COURSE, CYCLING COURSE, WALKING TRAIL, ROWING COURSE) to either plan a new event or join an existing event. In addition, the user may choose to play a particular role in a selected event by selecting from the options PARTICIPANT/COACH/SPECTATOR. PARTICIPANT refers to an active role in the event (e.g., physically running the runner course event). COACH refers to a supportive role in the event (e.g., a motivator). SPECTATOR refers to a non-participating observer of the event.

If the event is one which is being created by the user (i.e., PLAN EVENT), the user may be prompted to select from friends or participants or groups to which an invitation or notice of the planned event may be sent. This option may be implemented by selecting SEND TO FRIEND/COMMUNITY option in FIG. 3C.

At the time of the event (e.g., either when the user joins a live event or a planned event is underway), the application 110 provides a view of the event to corresponding users based upon criteria such as group membership, user request, type of event, etc., at step 202.

The view represents an instance of the application 110, which may be perceived as a real or simulated course or activity. A user interface screen 400 of FIG. 4 displays a sample of an ongoing current event. As shown in FIG. 4, there are three participants 422 in the event and one coach (see, e.g., panel 430). The three participants 422 are actively engaged in a simulated runner's course, as shown in panel 420. The course 424 is illustrated as road with three mile markers 426.

At step 204, the application 110 receives performance data from the participants 422 through their corresponding user endpoint systems 104 and devices 114, 124, and 134. For example, one of the participants may be running on a treadmill at home, whereby the performance data, such as speed, distance, incline, etc., is captured by the treadmill (serving as the performance capturing device 114) and transmitted via the communication device 124 to the host system 102, which then processes the performance data as described further herein. In another example, one of the participants 422 may be running on an outdoor track. Various performance capturing devices 114, such as a GPS device, pedometer, video recording device, accelerometer, or a combination of the above may be used to capture the performance data and simultaneously transmit the data to the host system 102.

In addition, the application 110 may also receive other information besides performance data. For example, the application 110 may receive audio commentary, video commentary, images, text-based messages, and other communications from any of the participants, coaches, or observers of the event via, e.g., one or more of the devices 114, 124, and 134 on endpoint system 104.

At step 206, the application 110 processes the performance data received in step 204, and populates views of the event with representations of the users/participants of the endpoint systems 104 using positional data derived from the performance data. For example, the application 110 may utilize a start time associated with the event, along with speed and distance data to simulate a location on the course that specifies the performance or progress of each participant. As indicated above, factors such as wind speed, topography, resistance, and other performance data derived from the endpoint systems 104 may be used to calibrate, and maybe modify, these positional locations on the course 424. In one exemplary embodiment, where various settings of the endpoint systems 104 can be controlled (e.g., the incline of a treadmill or the resistance of a stationary bike), the application 110 may be configured to automatically adjust these settings to mimic the terrain of a user at another endpoint system 104 who is participating in the event. For example, suppose a first user of an endpoint system 104 is participating in a jogging event via a treadmill, and a second user of another endpoint system 104 is participating in the jogging event via a real course (e.g., outdoor jogging trail). Various sensors of the second endpoint system 104 may capture data relating to the relative incline of the course and then use this captured data to modify the settings on the treadmill operated by the first user. Likewise, if the second user of the other endpoint system 104 is participating in the jogging event via a treadmill, and the user increases the incline of the treadmill, the application 110 may capture this modified setting and adjust the settings on the first endpoint system 104 (e.g., first user's treadmill) to match the setting of the second treadmill.

The application 110 may display updated performance data on the views, as shown in panel 410 of FIG. 4. Non-participants, such as a user representing a coach, may access a view of the event and provide comments via one or more devices from the endpoint system 104, which is then populated in a panel 430 for each participant to see.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The exemplary embodiments can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:
1. A method, comprising:
providing a view of an instance of an application on endpoint systems in response to a common option received from users of the endpoint systems of the application;

receiving a role from each of the users, wherein roles are selectable by the users and include an active participant role and a coach role;

receiving performance data from the endpoint systems;

populating the view with virtual representations of the users of each of the endpoint systems having the active participant role, the populating including positioning the virtual representations at various locations in the view, the various locations indicative of the performance data; and populating the view with comments from the endpoint systems having the coach role.

2. The method of claim 1, wherein the view represents an event selected as the common option, the event comprising a simulated exercise course.

3. The method of claim 1, wherein the
comments include
video comments.

4. The method of claim 1, wherein the performance data is captured by devices of the endpoint systems, the devices including:
a performance capturing device;
a communication device; and
a graphical display device.

5. The method of claim 4, wherein the performance capturing device includes
an accelerometer.

6. The method of claim 4, wherein the communication device comprises
a cellular telephone.

7. The method of claim 1, wherein:
the view represents an event selected as the common option, the event comprising a live exercise course;
a portion of the performance data is captured by a global positioning system of the endpoint systems; and
the virtual representations populated on the view include a geographic location of the users at the live exercise course.

8. The method of claim 4, wherein the communication device is embedded into a physical exercise machine.

9. A system, comprising:
a host system computer; and
an application executing on the host system computer, the application implementing a method, the method comprising:
providing a view of an instance of an application on endpoint systems in response to a common option received from users of the endpoint systems of the application;
receiving a role from each of the users, wherein roles are selectable by the users and include an active participant role and a coach role;
receiving performance data from the endpoint systems; and
populating the view with virtual representations of the users of each of the endpoint systems having the active participant role, the populating including positioning the virtual representations at various locations in the view, the various locations indicative of the performance data; and
populating the view with comments from the endpoint systems having the coach role.

10. The system of claim 9, wherein the view represents an event selected as the common option, the event comprising
a simulated exercise course; and
wherein the
comments include
video comments.

11. The system of claim 9, wherein the performance data is captured by devices of the endpoint systems, the devices including:
a performance capturing device;
a communication device; and
a graphical display device.

12. The system of claim 11, wherein the performance capturing device includes
an accelerometer.

13. The system of claim 11, wherein the communication device comprises
a cellular telephone.

14. The system of claim 11, wherein the communication device is embedded into a physical exercise machine.

15. A computer program product including a tangible computer-readable storage medium having computer program instructions encoded thereon, which when executed by a computer cause the computer to implement a method, the method comprising:
providing a view of an instance of an application on endpoint systems in response to a common option received from users of the endpoint systems of the application;
receiving a role from each of the users, wherein roles are selectable by the users and include an active participant role and a coach role;
receiving performance data from the endpoint systems;
populating the view with virtual representations of users of each of the endpoint systems having the active participant role, the populating including positioning the virtual representations at various locations in the view, the various locations indicative of the performance data; and
populating the view with comments from the endpoint systems having the coach role.

16. The computer program product of claim 15, wherein the view represents an event selected as the common option, the event comprising
a simulated exercise course; and
wherein the
comments include
video comments.

17. The computer program product of claim 15, wherein the performance data is captured by devices of the endpoint systems, the devices including:
a performance capturing device;
a communication device; and
a graphical display device.

18. The computer program product of claim 17, wherein the performance capturing device includes
an accelerometer.

19. The computer program product of claim 17, wherein the communication device comprises
a cellular telephone.

20. The computer program product of claim 17, wherein the communication devices is embedded into a physical exercise machine.

* * * * *